No. 696,364. Patented Mar. 25, 1902.
J. GARDNER.
DROP LIGHT.
(Application filed Feb. 18, 1901.)
(No Model.)
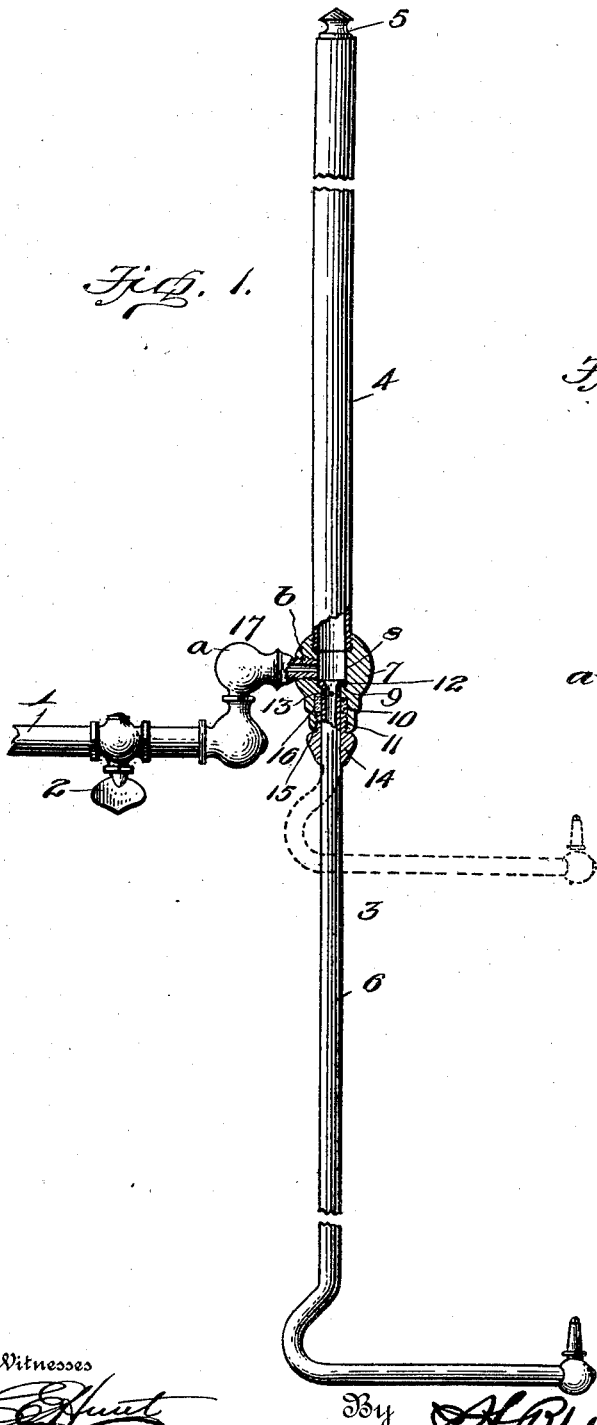
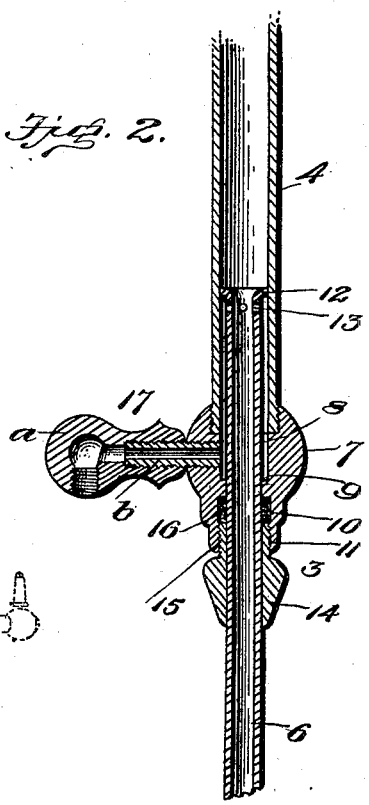

UNITED STATES PATENT OFFICE.

JAMES GARDNER, OF CHICAGO, ILLINOIS.

DROP-LIGHT.

SPECIFICATION forming part of Letters Patent No. 696,364, dated March 25, 1902.

Application filed February 18, 1901. Serial No. 47,808. (No model.)

*To all whom it may concern:*

Be it known that I, JAMES GARDNER, a citizen of the United States, residing at Chicago, in the county of Cook and State of Illinois, have invented certain new and useful Improvements in Drop-Lights; and I do declare the following to be a full, clear, and exact description of the invention, such as will enable others skilled in the art to which it appertains to make and use the same.

The invention relates to drop-lights.

The object of the invention is to provide a device of this character which may be attached to a gas-fixture—such as a chandelier, side jet, or any other fixture through which there is a flow of illuminating-gas and which may be easily and quickly adjusted vertically to the desired position and which will be automatically held in its adjusted position.

With these and other objects in view the invention consists of certain novel features of construction, combination, and arrangement of parts, which will be more fully described, and particularly pointed out in the appended claims.

In the accompanying drawings, Figure 1 is a side view, partly in section, of the improved drop-light, showing it attached to a side jet. Fig. 2 is an enlarged sectional view of the fixed and sliding members of the drop-light and the union or coupling, the upper end of the sliding member being shown projected into the lower end of the fixed member.

In the drawings, 1 denotes the gas-supply pipe, and 2 denotes its controlling-cock.

3 denotes a drop-light which consists of a fixed pipe 4, the upper end of which is closed with a cap 5 and the lower end of which is screw-threaded, a sliding member 6, and a coupling or union 7. The coupling or union is provided with a central bore 8, screw-threaded near its upper end to receive the screw-threaded end of the pipe 4, and is provided with an annular stop or shoulder 9 and with a stuffing-box 10, interiorly screw-threaded near its lower end, as shown at 11. The upper end of the sliding pipe 6 is formed or provided with an outwardly-projecting flange 12, which is of the same diameter as the internal diameter of the pipe 4, and when projected into said pipe snugly fits into the wall thereof and when lowered to its lowermost position abuts against the shoulder 9, and is thereby prevented from being accidentally withdrawn. This pipe 6, near its upper end and immediately below its annular flange, is provided with a series of perforations 13, so that when the upper end of said pipe is projected into the pipe 4 gas will be permitted to enter through said perforations.

14 denotes a nut having external threads 15, which are adapted to engage the threads of the stuffing-box. 16 denotes packing or stuffing placed within said box and formed about a gas-tight joint between the union and the sliding pipe. By adjusting this nut the packing or stuffing will be compressed and tightened to the pipe 6, so that when raised or lowered it will be held without additional fastening means in its adjusted position. The flange 12 of the pipe serves two functions—namely, one to limit the downward movement of the pipe 6 and the other to steady said pipe in its movement through the stuffing-box and prevent the wabbling thereof. This is due to the fact that when the upper end of the sliding pipe 6 is within the pipe 4 said pipe 6 has two points of contact, one being with the union and the other being with the pipe 4, so that wabbling or tilting movement will be entirely prevented and the lateral pressure applied to the pipe 6 will be resisted, and thus the packing will be prevented from being pressed laterally by said pipe 6, which would naturally tend to loosen its connection with said pipe and permit not only the escape of the gas at this point, but at the same time make the parts so loose as to prevent the packing acting as a holding medium for retaining the sliding pipe in its several adjusted positions.

Any suitable means may be employed for connecting the union with the gas-supply pipe—such, for instance, as a nipple 17, consisting of the parts *a* and *b*, one screwed into the other and the part *b* screwed into the union and communicating with its central bore, while the part *a* is adapted for engagement with the gas-supply pipe.

From the foregoing description, taken in connection with the accompanying drawings, the construction, mode of operation, and advantages of my improved drop-light will be readily understood without requiring a more extended explanation.

Various changes in the form, proportion, and minor details of construction may be made within the scope of the invention without departing from the spirit or sacrificing any of the advantages thereof.

Having thus described my invention, what I claim, and desire to secure by Letters Patent, is—

1. The combination with a chandelier, of a drop-light attachment comprising a tubular case provided with a lateral branch secured to the chandelier, and said chandelier supporting the entire attachment, and said case extending upwardly from said lateral branch and on the outside of the chandelier; and an extension-pipe adapted to carry a burner and telescoping said tubular case, as set forth.

2. The combination with a chandelier, of a drop-light attachment, comprising a vertical tubular case having at its lower end a gland and packing and a lateral branch rigidly secured to the chandelier, and said chandelier supporting the entire attachment, and said case also provided with a closed upper end; and an extension-pipe adapted to carry a burner and extending through said gland and packing up into said case, as set forth.

3. A drop-light attachment for chandeliers or similar gas-fixtures, comprising a T-piece having a lateral branch adapted for attachment to said fixture, and also provided with an interior annular shoulder, $f$, below said branch; a tubular case secured in the upper end of said T-piece; a gland secured in the lower end of said T-piece with packing interposed between said shoulder and gland; an extension-pipe for the burner and telescoping in said case and held at various elevations therein by said gland and packing; and a collar secured to the upper open end of said extension-pipe and adapted to abut against said annular shoulder to limit the downward movement of said pipe, said collar being provided with one or more grooves or passages for the gas, as set forth.

4. The combination with a chandelier of a tubular case rigidly supported thereon and extending upwardly on the outside of the main gas-pipe of the chandelier, said case being provided with a branch through which gas may flow from said gas-pipe to said case; an extension-pipe carrying a burner and telescoping said tubular case, and a collar secured to the upper open end of said extension-pipe and provided with one or more passages through which gas may flow from said case to said extension-pipe, as and for the purpose set forth.

5. The combination with a chandelier, of a tubular case rigidly supported thereon and extending upwardly on the outside of the main gas-pipe of the chandelier; means whereby gas may flow from said main gas-pipe to said case, and an extension-pipe carrying a burner and telescoping said tubular case, as and for the purpose set forth.

6. In a drop-light, the combination with a union having a gas-inlet, of two pipes connected to the union, one having a sliding engagement with the union and a telescopic movement within the other pipe, said sliding pipe being of less diameter than the internal diameter of the other pipe and provided at its upper end with an outwardly-projecting flange which engages the interior wall of the other pipe and provided below said flange with an opening, substantially as set forth.

7. In a drop-light, the combination with a union having a gas-inlet, and a bore formed with a stop-shoulder, of a pipe fixed to the union, a second pipe having a sliding movement within the bore and being of less diameter than the first-named pipe and provided at its upper end with a laterally-projecting flange which is adapted to engage the interior wall of the first-named pipe, said sliding pipe being provided below the flange with openings, substantially as set forth.

8. In a drop-light, the combination with a union having a gas-inlet, and a bore formed with a stop-shoulder, of a pipe fixed to the union, a second pipe having a sliding movement within the bore and being of less diameter than the first-named pipe and provided at its upper end with a laterally-projecting flange which is adapted to engage the interior wall of the first-named pipe, said sliding pipe being provided below the flange with openings, a stuffing-box through which the sliding pipe projects, a packing within the stuffing-box, and a nut for clamping the packing to the pipe to prevent the escape of gas and also to exert friction upon said sliding pipe to hold it in adjusted position, substantially as set forth.

In testimony whereof I have hereunto set my hand in presence of two subscribing witnesses.

JAMES GARDNER.

Witnesses:
FRANCIS E. WHITE,
CURTIS E. ROLEAU.